(12) United States Patent
Hinkel et al.

(10) Patent No.: US 9,426,383 B1
(45) Date of Patent: Aug. 23, 2016

(54) DIGITAL CAMERA FOR CAPTURING SPECTRAL AND SPATIAL INFORMATION

(71) Applicant: Amazon Technologies, Inc., Reno, NV (US)

(72) Inventors: Bradley Lawrence Hinkel, Kirkland, WA (US); William Nathan John Hurst, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 74 days.

(21) Appl. No.: 14/311,005

(22) Filed: Jun. 20, 2014

(51) Int. Cl.
| | |
|---|---|
| H04N 5/238 | (2006.01) |
| G01J 3/28 | (2006.01) |
| G01J 3/18 | (2006.01) |
| H04N 5/369 | (2011.01) |

(52) U.S. Cl.
CPC . *H04N 5/238* (2013.01); *G01J 3/18* (2013.01); *G01J 3/2823* (2013.01); *H04N 5/369* (2013.01)

(58) Field of Classification Search
CPC .......... H04N 9/045; G01J 3/0205; G01J 3/18; G01J 3/2823; G01J 3/0208; G01J 3/0248; G01J 3/36; G02B 5/1842; G02B 5/02; G02B 5/1814; G02B 5/18–5/1895
USPC ....................................................... 348/336
See application file for complete search history.

(56) References Cited

U.S. PATENT DOCUMENTS

| | | | | |
|---|---|---|---|---|
| 8,081,244 B2* | 12/2011 | Golub | ................... | G01J 3/2803 348/294 |
| 8,649,008 B2* | 2/2014 | Kashani | ................... | A61B 3/12 351/206 |
| 2008/0247274 A1* | 10/2008 | Seltzer | ................... | G01S 3/8083 367/125 |
| 2009/0225277 A1* | 9/2009 | Gil | ..................... | A61B 5/14555 351/206 |
| 2009/0225407 A1* | 9/2009 | Nakayama | ............. | G02B 21/16 359/370 |
| 2011/0178785 A1* | 7/2011 | Tinnemans | ........ | G01N 21/4785 703/2 |
| 2011/0206291 A1* | 8/2011 | Kashani | ................... | A61B 3/12 382/255 |
| 2012/0133944 A1* | 5/2012 | Iwasaki | ................. | G01J 3/0205 356/445 |
| 2013/0194481 A1* | 8/2013 | Golub | .................... | H04N 9/045 348/336 |
| 2014/0193839 A1* | 7/2014 | Cunningham | ............ | G01J 3/44 435/7.92 |
| 2014/0285429 A1* | 9/2014 | Simmons | ............. | G02B 27/225 345/156 |

OTHER PUBLICATIONS

Descour et al., "Computed-tomography imaging spectrometer: experimental calibration and reconstructions results," *Applied Optics*, vol. 34, No. 22, Aug. 1, 1995, pp. 4817-4826.

* cited by examiner

*Primary Examiner* — Pritham Prabhakher
(74) *Attorney, Agent, or Firm* — Klarquist Sparkman, LLP

(57) ABSTRACT

The following description is directed to systems and methods for digital cameras. In one embodiment, a camera can comprise an optical system, a sensor array, a color spreader, a memory, and a controller. The optical system can focus an image. The sensor array comprises a plurality of pixels and can be configured to capture image data. The color spreader can be positioned between the optical system and the sensor array. The color spreader can comprise an array of segments, where each respective segment can be configured to spread a spectrum of incident light toward a corresponding group of pixels using diffraction or refraction. The memory can store one or more spatial models. The controller can be coupled to the sensor array and the memory. The controller can be configured to reconstruct spectral and spatial components of the image from the captured image data and one of the spatial models.

19 Claims, 8 Drawing Sheets

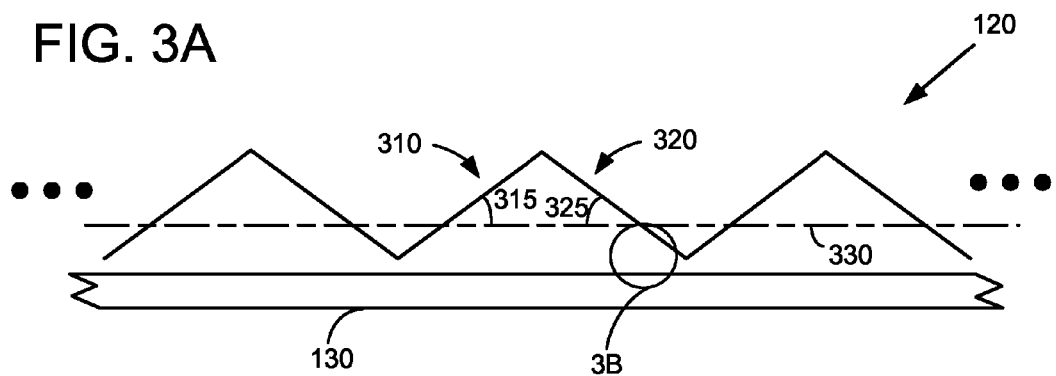
FIG. 3A
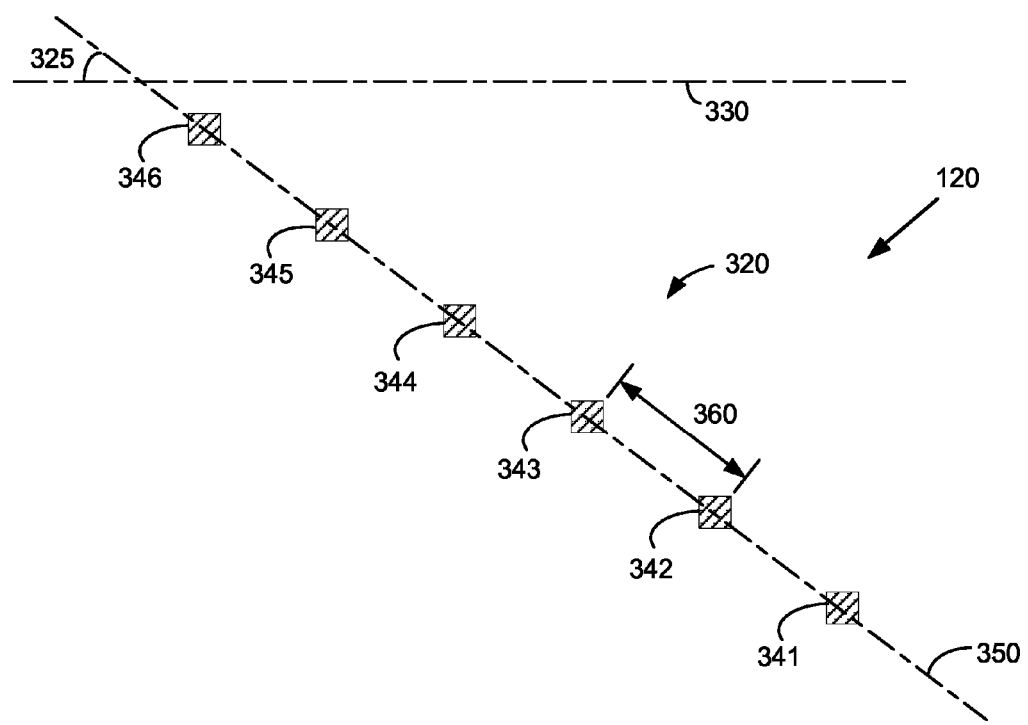
FIG. 3B
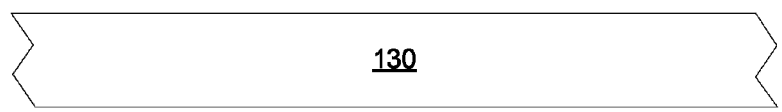

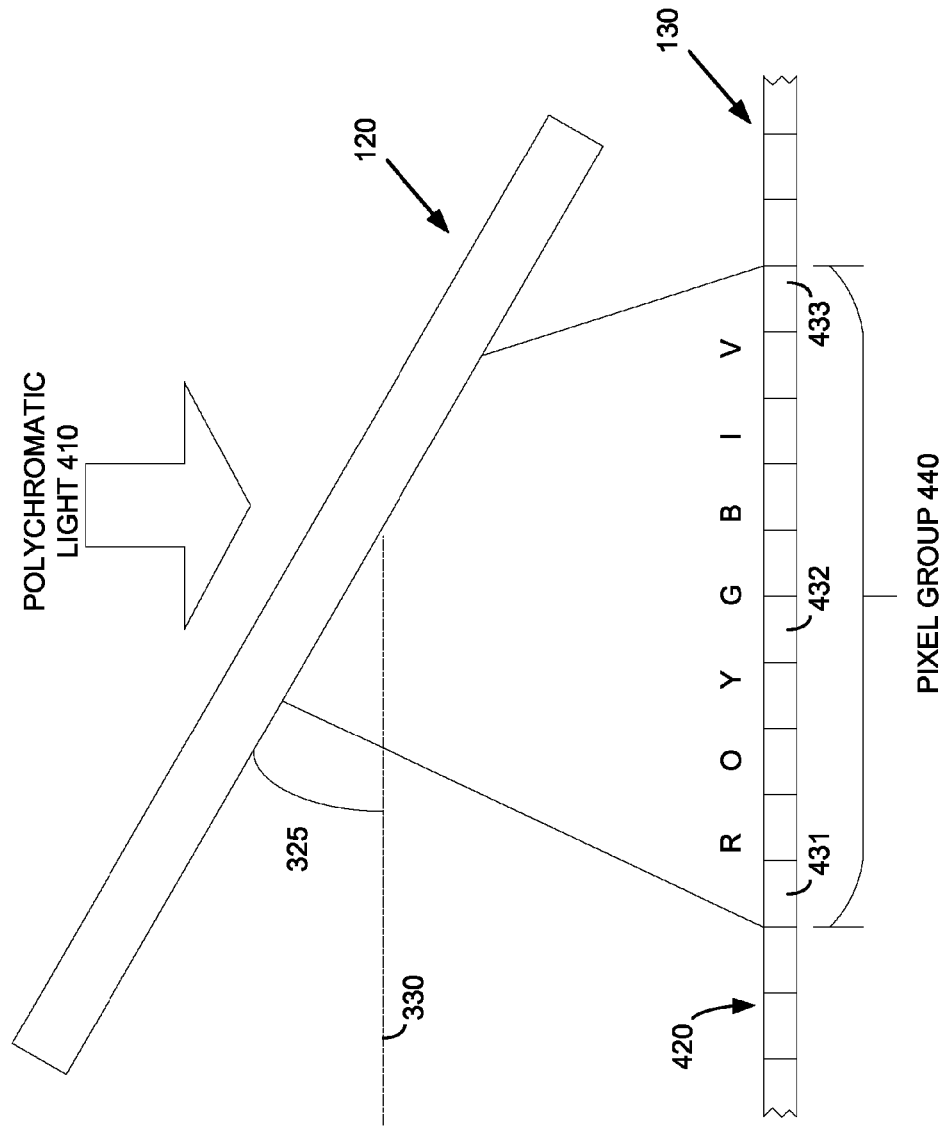

DIGITAL CAMERA FOR CAPTURING SPECTRAL AND SPATIAL INFORMATION

BACKGROUND

A typical multispectral image system includes a pixel array for sensing the intensity of incoming light and a filter array for limiting the light hitting an individual pixel to a given frequency range. For example, a traditional digital camera can include a color filter array having three color filter elements, such as red, green, and blue elements. Thus, a traditional digital camera divides the visible spectrum into three components where each color filter element transmits light of one color and absorbs light outside of the selected color spectrum. A common configuration of the color filter array is the Bayer filter mosaic, where the three color filter elements are arranged in groups of four as 2×2 grids across the array. Within the group of four filter elements, one filter element transmits red light, one transmits blue light, and two transmit green light. Thus, only about 50% of the green light, 25% of the blue light, and 25% of the red light make it through the filter and can contribute to the signals reaching the pixels. Consequently, current cameras are limited to three specific spectral values, which limits the ability to render an image with full color detail.

BRIEF DESCRIPTION OF THE DRAWINGS

FIGS. 3A-3B show cross-sectional views of an exemplary portion of the diffraction grating.

FIG. 4 shows details of how light incident on the diffraction grating can be spread and diffracted toward the sensor array of the camera of FIG. 1.

DETAILED DESCRIPTION

As an alternative to a camera having red, green, and blue (RGB) filters, a "color spreader" can be placed between a camera's lens and the sensor array to create an image with smeared colors on the sensor array. The color spreader can use various optical properties, such as diffraction, interference, or dispersion/refraction, to smear or spread the incoming light spatially across multiple pixels of the sensor array. For example, a diffraction grating can be placed between a camera's lens and the sensor array to create a color diffracted image on the sensor array. The image formed at a sensor of the sensor array can be a convolution of the position in the image and the spectral component of the image. The diffraction grating can spatially distribute the light as opposed to selectively filtering (e.g., absorbing) the light of different frequencies. Thus, the diffracted spectral components reaching the sensor array can provide a more complete color response than a traditional RGB sensor which is limited to three specific spectral values.

The position and spectral values of the image can be separated by using sparse recovery techniques, such as compressive sensing and non-negative matrix factorization. Using these techniques, the positional accuracy and spectral accuracy can be traded off to provide either image sharpness or image color detail. For example, the improved spectral response can be used to determine precise color characteristics of a scene so that the chemical makeup of objects can be determined. As another example, improved spectral response can be used to create a camera that more accurately mimics the spectral response of the human eye, thus creating perceptually more accurate color photos.

By using a diffraction grating instead of color filters to obtain spectral information, the sensor array can potentially receive a higher fraction of light from a scene and the camera may be more sensitive than a traditional camera that relies on color filtering to obtain color information. In other words, the diffraction grating may pass more photons to the sensor array as compared to a traditional RGB filter that absorbs photons at each of the filter elements. Further, because the spectral response from a diffraction grating is continuous, the color sensing range of a camera using diffraction can be greater than a traditional RGB camera. For example, an RGB camera can filter out much of the color in the purple and turquoise ranges. However, more of the purple and turquoise light can reach the sensor array when the light entering the camera is not filtered. Thus, the color gamut of a camera using a diffraction grating to spatially spread the spectrum of light can potentially include the entire color sensing range of the human eye.

Figure 1:
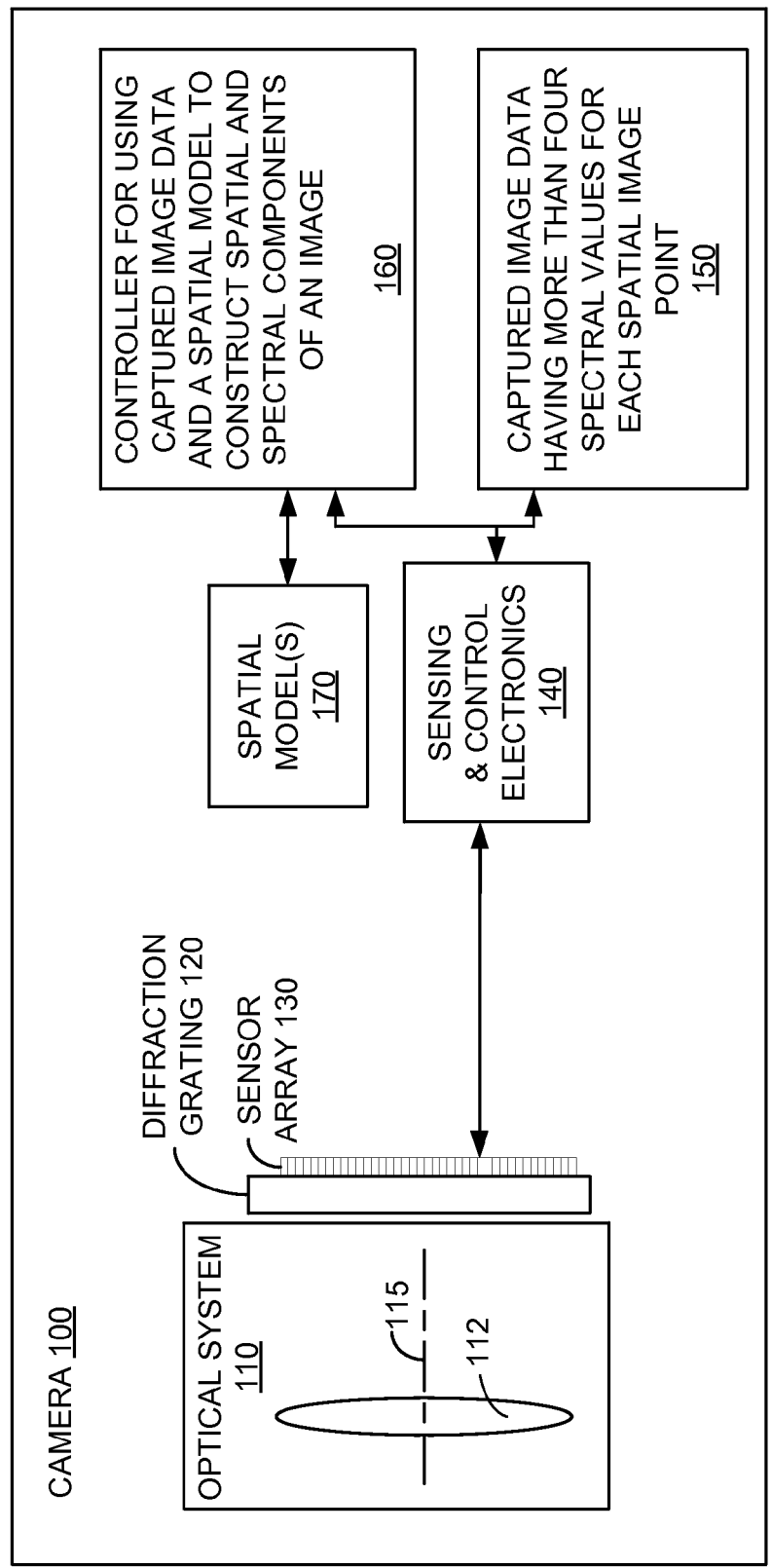
FIG. 1 is an example system diagram showing a camera for capturing spatial and spectral components of an image.

FIG. 1 is an example system diagram showing a digital camera 100 for capturing spatial and spectral components of an object. The camera 100 can include an optical system 110, a diffraction grating 120, and a sensor array 130. The optical system 110 can focus light via a lens 112 along the optical axis 115, through the diffraction grating 120, and onto the sensor array 130. The optical system 110 can include one or more of lenses, mirrors, optical splitters, shutters, apertures, covers, or optical filters as are known in the art to form an image onto the sensor array 130. For example, the optical system 110 can include an adjustable lens for focusing on objects that are different distances from the camera 100. The optical system 110 can include a high-pass, low-pass, or band-pass filter for reducing the spectrum of light reaching the diffraction grating 120. For example, a filter can be used to block infrared or ultraviolet light. The optical system 110 can include anti-glare filters, or polarizers, for example. Finally, the optical system 110 can include an adjustable aperture for controlling the amount of light reaching the sensor array 130.

The sensor array 130 can comprise a plurality of light sensors or pixels arranged in a two-dimensional array. Each pixel can measure the intensity of light reaching the pixel and can convert the intensity of light shining on the pixel into a corresponding electronic signal. The pixel can be a charge-coupled device (CCD) or a complementary metal-oxide-semiconductor (CMOS) photo-detector, for example. The collection of the pixel values at a point in time or within a time interval can be the data corresponding to an image, e.g., the image data. For example, a CCD sensor array may use a global shutter where all pixel values can be captured at a single point in time. As another example, a CMOS sensor array may use a rolling shutter where the pixel values are scanned out one row or one column at a time so that the image data includes the pixel values corresponding to all of the rows and columns of the sensor array.

The diffraction grating 120 is positioned between the optical system 110 and the sensor array 130. In other words, the diffraction grating 120 is in the optical path of the light directed from the optical system 110 toward the sensor array 130. The diffraction grating 120 is one type of color spreader. Generally, diffraction causes light to deviate from a straight-line path. Diffraction can occur when light waves pass through small openings or past sharp edges. The diffraction grating 120 is an optical component with a periodic structure that diffracts and spreads light of different frequencies into different directions. The direction the light travels can depend on a spacing of the diffraction grating 120 and the frequency or wavelength of the light. It should be well understood that light can be characterized by its frequency or its wavelength, where the wavelength of light is inversely proportional to the frequency of light. The diffraction grating 120 acts as a dispersive element to "smear" the colors of the image focused onto the diffraction grating 120, e.g., different colors of the image can be distributed by different spatial amounts. The spreading of the light spectrum can cause the spatial and spectral components of an image to be mixed or blended together. Thus, a particular photon hitting a pixel may be due to the point in space where the photon came from (the spatial component) or the frequency of the photon (the spectral component).

In an alternative embodiment, the diffraction grating 120 can be replaced with a different type of color spreader. The color spreader can use various optical properties to smear the light, such as diffraction or dispersion/refraction, to spread the incoming light spatially across multiple pixels of the sensor array. Generally, a refractive index of a material is a function of light wavelength, which can cause dispersion of the light. The amount of dispersion in a material for optical wavelengths can be measured by an Abbe number, V, where increasing Abbe numbers correspond to decreasing dispersion. Dispersion can cause the spreading of colors in a prism or chromatic aberration in a piece of glass or a lens. Thus, one embodiment of a color spreader can be a prism or an angled piece of glass. For example, a prism can be used to spread or smear polychromatic light (e.g., light of multiple frequencies) across a continuous color spectrum. The amount of the spreading can be calculated from the angle of incidence of the light wave, the geometry of the prism, the Abbe number, and Snell's law. Snell's law describes the relationship between the angles of incidence and refraction for light waves passing through a boundary between two different media (such as air and the prism). The angle of refraction of light in a material depends on the refractive index of the material, which varies with the wavelength of the light, causing an angular separation of the colors known as angular dispersion. The refraction indices of most transparent materials decrease with increasing wavelength in the visible spectrum.

The diffraction grating 120 can comprise a two-dimensional array of diffraction segments (e.g., an array of diffraction gratings). Each segment can be associated with one or more points in space that are being imaged. For example, each segment can be associated with more than four spectral values for each spatial image point. Each respective diffraction segment is mapped to a corresponding group of pixels of the sensor array 130. For example, a diffraction segment can be mapped to a 5×5, an 8×8, or a 10×10 array of pixels that is in alignment with the diffraction segment along the optical axis 115. Other array sizes can be used depending on the particular design. Each diffraction segment can include at least one angled portion with respect to the sensor array 130. In one embodiment, the diffraction grating 120 can be manufactured on the surface of the sensor array 130 using a conventional multi-layer semiconductor or thin-film process so that the diffraction grating 120 and sensor array 130 are integral (i.e., monolithic). In other embodiments, the sensor array 130 can be separated from the diffraction grating 120.

Sensing and control electronics 140 can communicate with the sensor array 130 to capture image data from the sensor array 130. For example, the sensing and control electronics 140 can control a frame rate at which images are captured from the sensor array 130. The frame rate is the rate at which successive images (e.g., frames) can be captured. For example, video can be captured at around twenty-four frames per second or higher. In one embodiment, the camera 100 can be a still camera for capturing a single image. Additionally or alternatively, the camera 100 can capture video (e.g., a series of images) at the frame rate of the camera 100. The sensing and control electronics 140 can include amplifiers and analog-to-digital converters for converting the charge from a pixel into a digital value for each pixel. The sensing and control electronics 140 can be integrated with the sensor array 130 or can be separate therefrom. The sensing and control electronics 140 can store captured pixel values, e.g., image data, in a memory or communicate the pixel values to the controller 160. For example, the captured pixel values can be stored at captured image data 150. The captured image data 150 can include spectral and spatial information, where each spatial image point may have more than four spectral values. The captured image data 150 can be stored on one or more computer-readable storage media, such as volatile memory (including dynamic random access memory (DRAM) or static random access memory (SRAM)) or non-volatile memory (including flash memory or a hard disk drive).

One or more spatial models 170 can be stored on one or more computer-readable storage media, such as volatile memory or non-volatile memory. The spatial model(s) 170 can include statistical or other information about how objects can appear, such as how objects reflect light or what the edge of an object can look like. Generally, objects can be classified into different classes with different statistical properties. As an example, one class of objects can be natural objects. Natural objects tend to have correlation in color and lighting across the surface of the object until a sharp edge, e.g., a discontinuity, is reached. For example, the surface of a natural object may generally include smooth variations of tone and color until the edge of the object is reached. Further, edges of a natural object tend to be sparse within an image.

Using one of the spatial model(s) 170 and the captured image data, a controller 160 (e.g., processor, microcontroller, etc.) can be used to reconstruct spectral and spatial components of the image. For example, the controller 160 can take the blended spectral and spatial information of the image data and un-mix or reconstruct the spectral and spatial components of the image. The image data can be classified into a class of objects based on a statistical analysis of the image data. Alternatively, a default classification of the image data can be used. A class of objects can map to a corresponding spatial model from the spatial model(s) 170. The spatial model can then be used as a constraint to recover the spectral and spatial components of the image.

The controller 160 can reconstruct the spectral and spatial components of the image using well-understood compressive sensing techniques. Compressive sensing is a signal processing technique for acquiring and reconstructing a signal (in this case, an image), by finding a solution to an underdetermined system of linear equations. The system of linear equations describe the transformations of the light as it passes through the optical system 110 and the diffraction grating 120. An underdetermined system of linear equations has more unknowns than equations. In order to solve the underdetermined system of linear equations, constraints or assumptions about the image data can be made. Some constraints can be consistent across all spatial models and some constraints can be different for different spatial models. For example, one constraint that can be associated with a spatial model is that the data is smooth (e.g., the data from one pixel is correlated to its neighboring pixels). In other words, the color across an object tends to change slowly. Another constraint can be that the data is sparse (e.g., edges are rare compared to the body of the object). A constraint that can be consistent across all spatial models is that light is additive and so none of the spectral components of the image should be negative. The non-negative constraint allows non-negative matrix factorization to be used to find a model that extracts the color (e.g., spectral) components from the spatial components of the image.

Figure 2:
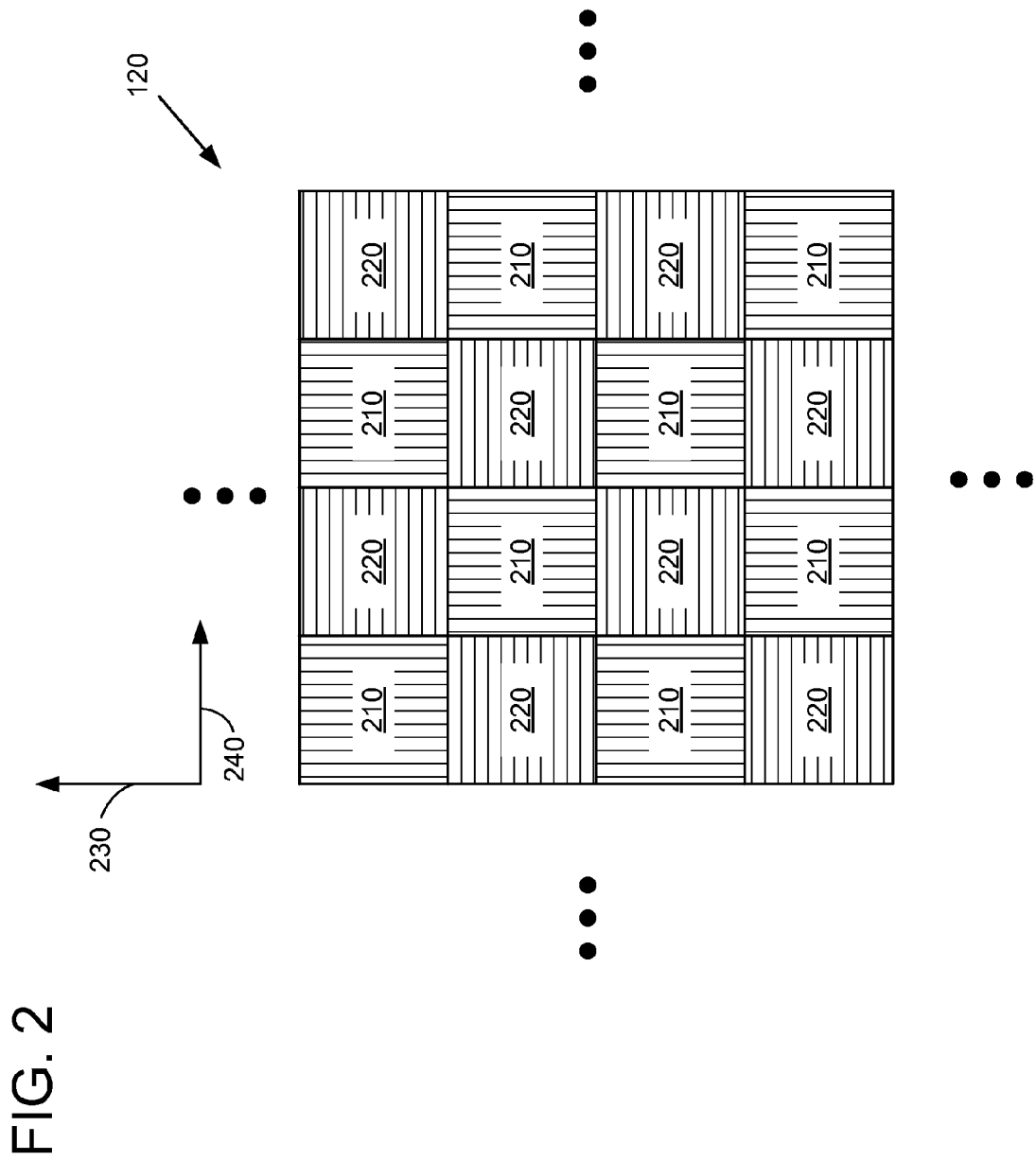
FIG. 2 shows a view of an exemplary portion of a diffraction grating of the camera of FIG. 1.

FIG. 2 shows a view of an example of a portion of the diffraction grating 120 when looking in a direction along the optical axis 115. The diffraction grating can comprise a two-dimensional array of diffraction segments 210 and 220 that is generally perpendicular to the optical axis 115. In other words, the optical axis 115 is generally normal to a plane of the diffraction grating 120. Generally, a diffraction segment can include parallel bars, ridges, rulings, or lines separated by transmissive slits. In an alternative embodiment, a diffraction segment can include spiral or concentric ridges, rulings, bars, or lines separated by transmissive slits. The diffraction grating 120 can comprise diffraction segments of different configurations and/or orientations. For example, the diffraction grating 120 can comprise a diffraction segment 210 including slits running along axis 230 of the diffraction grating 120 and a diffraction segment 220 including slits running along axis 240 of the diffraction grating 120. In one embodiment, the axes 230 and 240 can be perpendicular. The different diffraction segments 210, 220 can be arranged in different patterns on the diffraction grating 120. For example, the diffraction segments 210 and 220 can be arranged in a checkerboard pattern on the diffraction grating 120, as illustrated in FIG. 2. Thus, the diffraction segments 210, 220 can form a rotating ninety degree pattern to potentially increase the spreading of the spectrum of the light incident on the diffraction grating 120. Although FIG. 2 shows two different orientations of a same segment type, additional orientations can be used and/or different segment types can be used. Alternatively, all of the segments 210, 220 can be of the same type and orientation.

A diffraction segment, such as diffraction segment 210, can correspond to one or more spatial image points having multiple spectral values. For example, a respective diffraction segment 210, 220 can overlap a corresponding array of pixels, such as a 10×10 array of pixels that can be used to capture spectral and spatial information associated with the respective diffraction segment 210, 220. The diffraction segment 210 can include horizontal slits so that the spectral information is spread in a generally horizontal direction across the 10×10 pixel array. Thus, diffraction segment 210 can correspond to ten spatial points, where each horizontal row corresponds to one spatial point and ten spectral bands. The diffraction segment 220 can have vertical slits so that the spectral information is spread in a generally vertical direction across the pixel array. Thus, diffraction segment 210 can correspond to ten spatial points, where each vertical column corresponds to one spatial point and ten spectral bands.

In an alternative embodiment, the diffraction grating 120 can be replaced with a different type of color spreader and the segments 210, 220 can be color spreader segments of different orientations and/or configurations. For example, a first color spreader segment can include one or more prisms running along axis 230 of the color spreader and a second color spreader segment can include one or more prisms running along axis 240 of the color spreader. The color spreader segments can use various properties of light to disperse the colors across the sensor array 130, such as diffraction, dispersion/refraction, and interference. Non-limiting examples of color spreader segments can include holographic optical elements, micro-holes, pinholes, angled pieces of glass, shaped pieces of glass, micro-lenses, gradient-index materials (e.g., a material that has a variation in the refractive index over an area of the materials, and obstructions. The color spreader segments can be arranged in irregular or regular arrangements, such as arrays that are periodic or aperiodic.

FIGS. 3A-3B show views of an example of a portion of the diffraction grating 120. FIG. 3A shows a cross-sectional view of an embodiment of the diffraction grating 120 including a "tented" grating including multiple tent-shaped portions. As described further with reference to FIG. 3B, the cross-section is taken perpendicular to the parallel bars of the diffraction grating 120. FIG. 3A illustrates that the diffraction grating 120 can include a first portion 310 of the grating oriented at a first angle 315 relative to a plane 330, where plane 330 is generally parallel to a plane of the light-facing surface of the sensor array 130. The diffraction grating 120 can include a second portion 320 of the grating oriented at a second angle 325 relative to the plane 330. Together, portions 310 and 320 meet at a peak to form a tented shape. The diffraction grating 120 can include multiple tented shapes, such as an array of tented shapes, for example. In one embodiment, a diffraction segment, such as diffraction segments 210 and 220, can include a tented portion. In other words, a diffraction segment can comprise a tented grating comprising a first angled portion and a second angled portion. In an alternate embodiment, a diffraction segment can comprise only a first angled portion. Typically, the first and second angles 315, 325 have the same magnitude (such as forty-five degrees), but first and second angles 315, 325 can be oriented at different angles (e.g., angle 315 can be forty degrees and angle 325 can be fifty degrees).

In FIG. 3B, a close-up of the cross-sectional view of portion 320 of diffraction grating 120 is illustrated. Portion 320 can comprise multiple parallel bars, such as bars 341-346. Slits of the diffraction grating are the transmissive areas between the bars 341-346. A plane 350 through the bars 341-346 can form the angle 325 with respect to the plane 330. In one embodiment, the bars 341-346 can be manufactured on the sensor array 130 using a conventional multi-layer semiconductor or thin-film process. For example, a first, generally planar support layer can be deposited, grown, or spin-coated on the surface of the sensor array 130. As one example, the support layer can be silicon-dioxide that is grown by chemical vapor deposition (CVD). A first bar, such as bar 341, can be grown or printed onto the surface of the support layer. For example, a bar can be patterned aluminum or poly-silicon that is grown by CVD. A second support layer can be deposited, grown, or spin-coated on the surface of the first support layer and the bar 341. The second support layer can be planarized. A second bar, such as bar 342, can be grown or printed onto the surface of the second support layer. The successive growth and/or printing of support layers and bars can continue such that bars produced later in the process (such as bars 344 and 345) are further from the surface of the sensor array 130 than bars produced earlier in the process (such as bars 341 and 342).

If the support layers are transparent for the frequencies of interest, the support layer can remain. For example, silicon-dioxide can be generally transparent at the visible spectrum of light. However, if the support layer is not transparent for the frequencies of interest, the support layer can be removed or etched away from the diffraction grating so that the transmissive slits between the bars are filled with air. If the support layer is etched away, each bar can be supported by columns or vias placed at the ends of the bar, where the columns are attached to the sensor array 130. For example, the bar can be supported by columns at the edges of a diffraction segment. In one embodiment, thirty-two different layers of bars can be used for the diffraction grating 120. Thus, a tented grating segment can comprise sixty-three bars, where the first portion includes thirty-two bars, the second portion includes thirty-two bars, but one of the bars (the peak of the tent) is shared between the first portion and the second portion. The bars can be constructed of various materials that are opaque for the frequencies of interest. For example, silicon has a relatively high refractive index and can be effectively opaque.

It may be desirable to manufacture the diffraction grating 120 on the sensor array 130, such as described above with the conventional semiconductor or thin-film process, so that the diffraction segments can be accurately aligned with the pixels of the sensor array 130 and so the diffraction grating 120 can be physically attached to the sensor array 130. In an alternative embodiment, the diffraction grating 120 can be manufactured separately from the sensor array 130 and attached and aligned during assembly of the camera 100.

The optical qualities of the diffraction grating 120 can be determined, at least in part, by the spacing of the bars 341-346. A spacing or distance 360 can determine which wavelengths of light are diffracted by the diffraction grating 120. Light can be diffracted when the wavelength of the light is less than the spacing of the slits. Specifically, light of a given wavelength can be diffracted when the distance 360 is greater than the wavelength of the light. The amount of diffraction for a given wavelength of the light depends on the distance 360 and not on the width of the bars 341-346. Thus, it may be desirable to construct the bars 341-346 with a minimum feature size of the process so that more light is transmitted through the diffraction grating 120 to reach the sensor array 130. The distance 360 can be selected based on the wavelengths of interest of the light.

The visible spectrum includes wavelengths from about 390-700 nanometers (nm). The visible spectrum can be divided into different colors, where the wavelength of violet is about 380-450 nm, blue is about 450-495 nm, green is about 495-570 nm, yellow is about 570-590 nm, orange is about 590-620 nm, and red is about 620-750 nm. Infrared light includes wavelengths longer than the wavelengths of visible light, from about 750 nm to 1 millimeter (mm). The mid-range infrared wavelengths can be used for chemical analysis. Also, thermal radiation can be emitted at infrared wavelengths. Ultraviolet (UV) light includes wavelengths shorter than the wavelengths of visible light, from about 100-400 nm, with a subset of the UV light, UVA, including wavelengths of about 400-315 nm. Typical glass (such as the glass that can be used to make a lens or transparent cover of the optical system 110) can be partially transparent to UVA but may be opaque to shorter wavelengths, whereas silicon dioxide can be transparent to shorter UV wavelengths.

By making the distance 360 greater than 700 nm, the full spectrum of visible light can be diffracted by the diffraction grating 120. Infrared light (as well as visible light) can be diffracted when the distance 360 is greater than the infrared wavelength of interest. Thus, the range of wavelengths diffracted by the diffraction grating 120 can be increased by increasing the distance 360.

The light transmitted through the diffraction grating 120 is transmitted with a pattern caused by diffraction at each slit and interference of the light waves from the neighboring slits in the diffraction grating 120. For example, each slit in the grating can act as a point-source of light waves for each wavelength, where light from a point-source can travel with a spherical wavefront. The light from neighboring slits can also be travelling with a spherical wavefront. An interference pattern having alternate bright (maxima) and dim (minima) areas can be formed where the wavefronts meet at the sensor array 130. An area of minimum intensity for a given wavelength can occur where the path difference between the light from adjacent slits is equal to half the wavelength of the light so that the waves are out of phase. An area of maximum intensity for a given wavelength can occur where the path difference between the light from adjacent slits is equal to the wavelength of the light so that the waves are in phase. Thus, the maxima and minima of a diffraction pattern are different for different frequencies of light.

The path difference between adjacent slits for a beam of light normal to a diffraction grating is d*sin θ for any arbitrary angle θ. Thus, when the light from the diffraction grating is projected onto a plane parallel to the diffraction grating, the location of the maxima can be found from the equation:

$$d \sin \theta_m = m\lambda.$$

where d is the distance 360, λ is the wavelength of the light, m is the order of a maximum, and $\theta_m$ is the angle of deviation (relative to the diffraction grating's normal vector) of a maximum. The angle of deviation of the zeroth-order maximum, where m=0, is independent of the wavelength of the light. However, the angle of deviation of the first-order maximum, where m=1, depends on the wavelength of the light. For example, the angle of deviation of the first-order maximum is greater for longer wavelengths of light (such as red light) than for shorter wavelengths of light (such as violet light). Thus, as further described with reference to FIG. 4, it may be desirable to select the angle 325 so that the first-order maximum of the diffracted light is directed generally normal to the sensor array 130. In one embodiment, the angle 325 can be between twenty and sixty degrees. Alternatively, the angle 325 can be between thirty and forty-five degrees.

The bars 341-346 are illustrated with a square cross-sectional area, but triangular or other shaped cross-sectional areas can be used. For example, the diffracted energy associated with a particular order for a given wavelength can be increased by "blazing" the slits of the diffraction grating 120. Blazing can include shaping the cross-sectional profile of the bars 341-346. For example, the cross-sectional area of the bars 341-346 can be shaped so the diffracted energy associated with the first-order maximum for green light is increased.

FIG. 4 shows an example of how polychromatic light 410 incident on the diffraction grating 120 (or an alternative color spreader) can be spread and diffracted toward the sensor array 130. The polychromatic light 410 can include a continuous spectrum of light having multiple wavelengths. For example, the polychromatic light 410 can include light across the visible spectrum. The polychromatic light 410 can be directed generally along the optical axis 115. The polychromatic light 410 can be focused onto an image plane 330 so that the polychromatic light 410 is normal to the image plane 330 and a light-detecting surface 420 of the sensor array 130. In one embodiment, angle 325 can be selected so that the first-order maximum of the diffracted green (G) light is directed approximately normal to the sensor array 130. The diffracted red (R) light, having a longer wavelength than green light, is diffracted more than the green light. The diffracted violet (V) light, having a shorter wavelength than green light, is diffracted less than the green light. Thus, the continuous spectrum of the visible light (represented by "ROYGBIV" for red, orange, yellow, green, blue, indigo, and violet light) can be spatially distributed across the pixels of the sensor array 130. For example, pixel 431 can detect reddish light, pixel 432 can detect greenish light, and pixel 433 can detect light in the violet range. It should be understood that the visible spectrum is used here for explanatory purposes, and the spectrum or range of the polychromatic light 410 can extend into the infrared and/or the ultraviolet ranges. The polychromatic light 410 can exclude some wavelengths of light, such as when the optical system 110 includes a filter. For example, the optical system 110 can include a high-pass filter so that the ultraviolet and the visible ranges are filtered and only infrared light is focused toward the diffraction grating 120 and the sensor array 130.

A pixel group 440 can be an area of the sensor array 130 where one order (such as the first-order maximum) of the spectrum of interest is diffracted to. The pixel group 440 can comprise multiple pixels of the sensor array 130, such as pixels 431-433. For example, the pixel group 440 can comprise a 2×2, a 3×3, or a 10×10 array of pixels of the sensor array 130. The sensor array 130 comprises multiple pixel groups which may be overlapping or non-overlapping. The number of pixels in the pixel group 440 can determine the number of detectable spectral bands. For example, diffracting the spectrum of interest over ten pixels on a side (e.g., a 10×10 array) may potentially enable the recovery of ten spectral bands. By comparison, diffracting the spectrum of interest over two pixels on a side (e.g., a 2×2 array) may potentially enable the recovery of only two spectral bands.

The pixel group 440 can be associated with an area of the diffraction grating 120, such as a diffraction segment. For example, the pixel group 440 can correspond to a respective diffraction segment, such as one of the diffraction segments 210 or 220. The diffraction segment can overlap, or be aligned with, the pixel group 440 when observed along the optical axis 115. For example, the diffraction segment can be a rectangular region having a sufficient number of pixels so as to have a one-to-one correspondence between each spectral band of interest and each pixel. In one embodiment, the diffraction segment can include a mask around the periphery of the diffraction segment which can reduce the overlap of diffraction patterns from one diffraction segment and its neighboring diffraction segments. In other words, the diffraction segment can be configured so that light striking the diffraction segment's corresponding pixel group from neighboring diffraction segments is reduced. The mask can include reflective or absorptive material (such as aluminum or silicon) for the wavelengths of interest so that light incident to the mask is blocked from reaching the sensor array 130. In an alternative embodiment, the diffraction segments do not have a masking portion. Thus, light striking the diffraction segment's corresponding pixel group can include light diffracted from neighboring diffraction segments. In some embodiments, the size of each segment 210, 220 is chosen to map to a size of the pixel group 440.

Thus, the diffraction grating 120 can be used to blur, smear, or spatially distribute the spectral information of the image across the sensor array 130. The spectral information of an image captured by the sensor array 130 can be increased by spreading the spectral information over more pixels. For example, increasing the number of pixels in the pixel group 440 may enable finer differentiation of the spectra hitting each pixel. As another example, increasing the distance 360 can allow a broader range of wavelengths to be diffracted and potentially identified. However, increasing the distance 360 can increase the sum of the angles of deviation across the range of the wavelengths diffracted. Thus, increasing the captured spectral information may come at the cost of decreasing the captured spatial information, since the spatial information of the image is also spatially distributed across the sensor array 130. In other words, there can be a trade-off between the amount of spatial information captured by the sensor array 130 and the amount of spectral information captured by the sensor array 130. Also, since the spatial information and the spectral information are both distributed spatially across the sensor array 130, the spatial and spectral information can be blended together. As described below, with reference to FIGS. 6-7, software can be used to recover the spatial and spectral components of the image.

Figure 5:
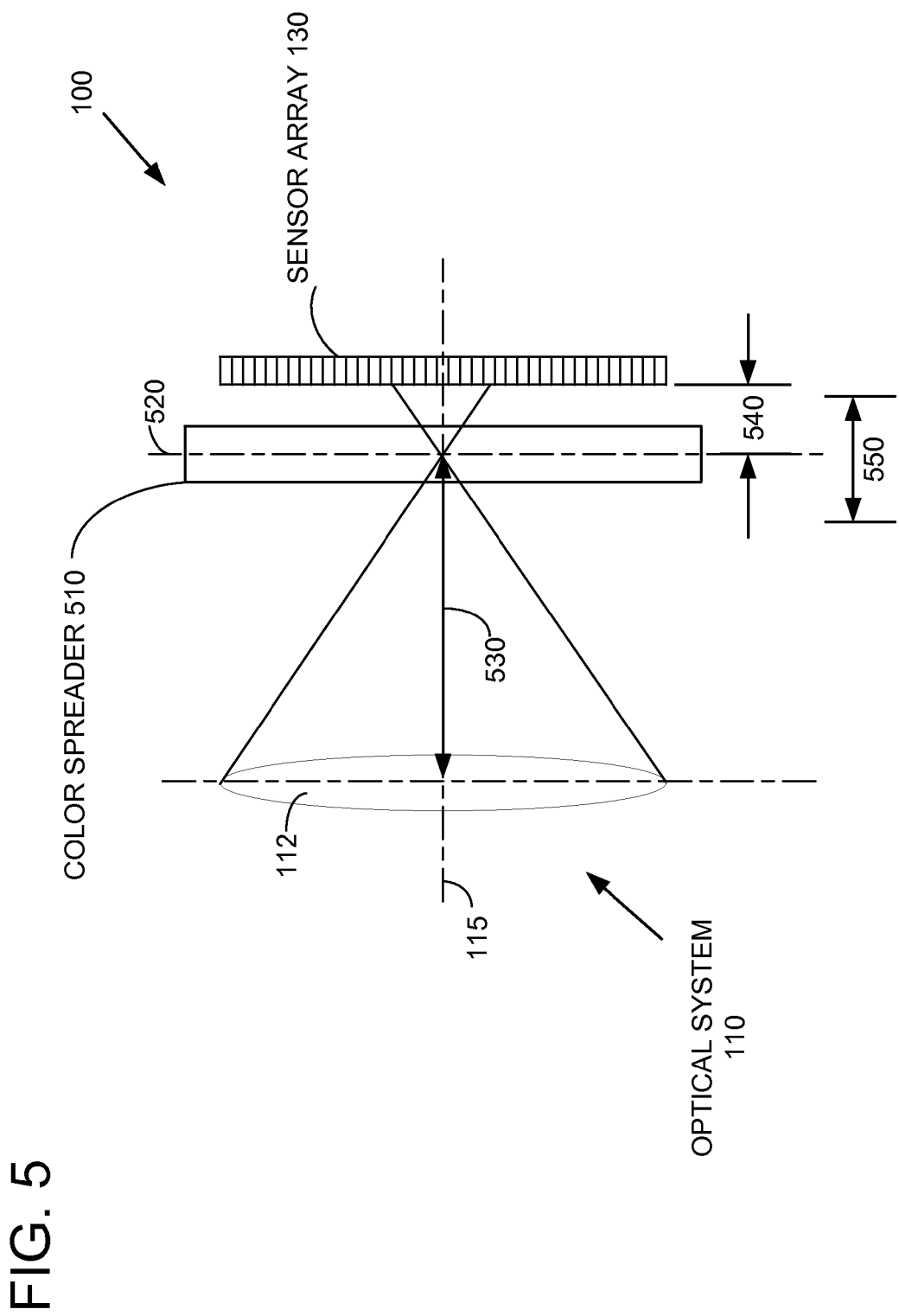
FIG. 5 illustrates aspects of a camera including a color spreader.

First, FIG. 5 illustrates some additional aspects of the camera 100. The camera 100 can comprise an optical system 110, a color spreader 510, and the sensor array 130. The color spreader 510 can be used for blending the spatial and the spectral components of an image focused onto an image plane 520. In one embodiment, the color spreader 510 can be the diffraction grating 120. Alternatively, the color spreader 510 can use a different configuration or other optical properties to blend the spatial and the spectral components of the image together. For example, the color spreader 510 can use refraction, dispersion, and/or interference to blend the spatial and the spectral components of the image together. For example, the color spreader 510 can be a prism or a shaped or angled piece of glass. The color spreader 510 can include an array of segments (e.g., an array of color spreaders) for spreading the spectrum of light of the image across the pixels of the sensor array 130. The segments can include color spreaders of one or more types and one or more orientations. As one example, the color spreader 510 can comprise a two-dimensional array of micro-prisms, where a respective micro-prism corresponds to a pixel group, and the refracted light of the respective micro-prism is directed toward the pixel group. Alternative examples of color spreader segments can include holographic optical elements, micro-holes, pinholes, angled pieces of glass, shaped pieces of glass, micro-lenses, gradient-index materials, and obstructions.

The color spreader 510 can be positioned close to the focal length 530 of the lens 112. For example, the distance from the lens 112 to a central plane through the color spreader 510 can be within five percent of the focal length 530. In one embodiment, the image plane 520 and the central plane through the color spreader 510 can be coincident. For example, the image plane 520 can be at the focal length 530 of the lens when the object to be focused is much farther away than the focal length 530 (e.g., the object distance approaches infinity). When the color spreader 510 is a diffraction grating, such as the diffraction grating 120, the central plane through the color spreader 510 can be a plane corresponding to the middle layer of the process for manufacturing the diffraction grating 120. For example, the central plane can correspond to layer sixteen of an angled diffraction grating manufactured with a thirty-two layer process.

As the light travels from the color spreader 510 and toward the sensor array 130, the colors of the image can become more spread out and the image can become less focused (e.g., more blurry). Thus, capturing an image farther from the central plane of the color spreader 510 may provide relatively higher spectral information and relatively lower spatial information. The distance 540 from the central plane of the color spreader 510 to the light-facing surface of the sensor array 130 can be varied to provide a desired trade-off of spectral and spatial information. The distance 540 can be affected by the angular dispersion of the color spreader 510, where increasing the angular dispersion (such as by using glass with a low Abbe number) can decrease the distance 540. The central plane of the color spreader 510 can also be moved within a range 550 of the image plane 520 to provide a desired trade-off of spectral and spatial information. The range 550 indicates that the distance from the lens 122 to the color spreader 510 can be less than or greater than the focal length 530. For example, a camera designed to provide more spatial information and less spectral information may include a sensor array 130 positioned so its surface is coincident with the image plane 520, and the central plane of the color spreader 510 can be at less than the focal length 530 of the lens 112.

Figure 6:
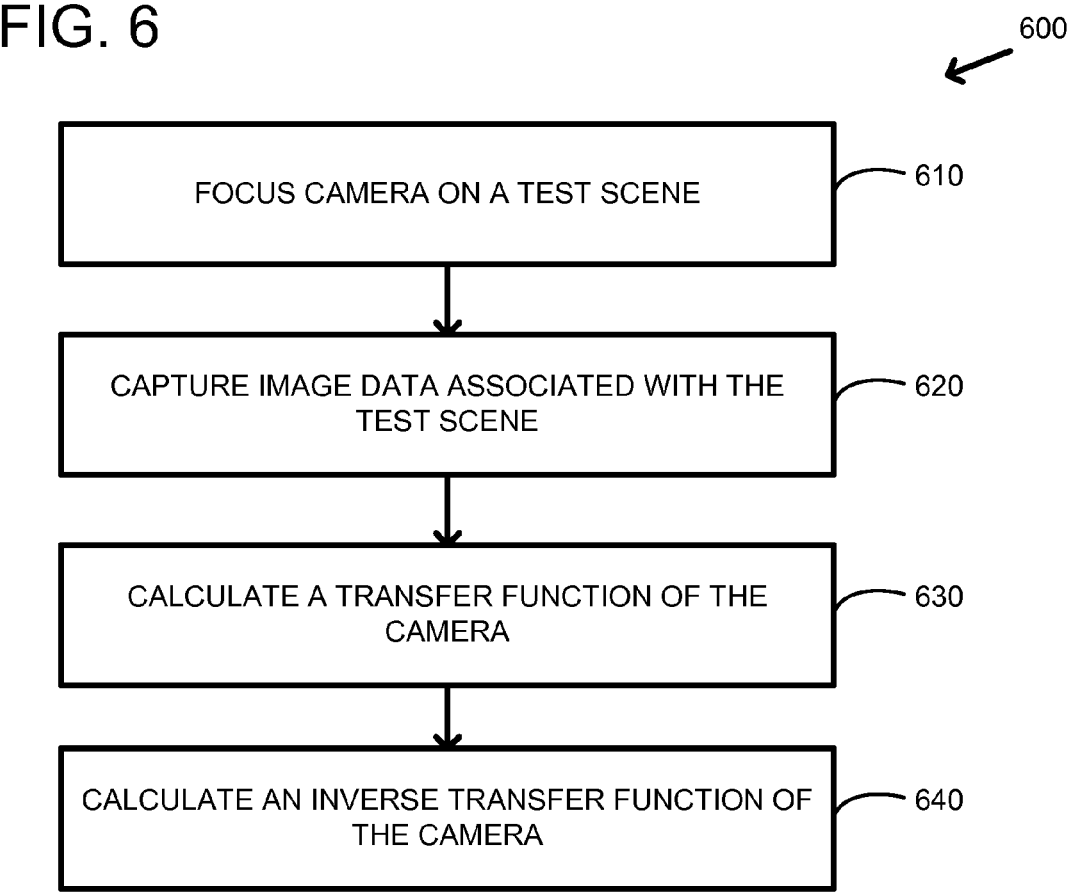
FIG. 6 shows an example method for calibrating a camera.
Figure 7:
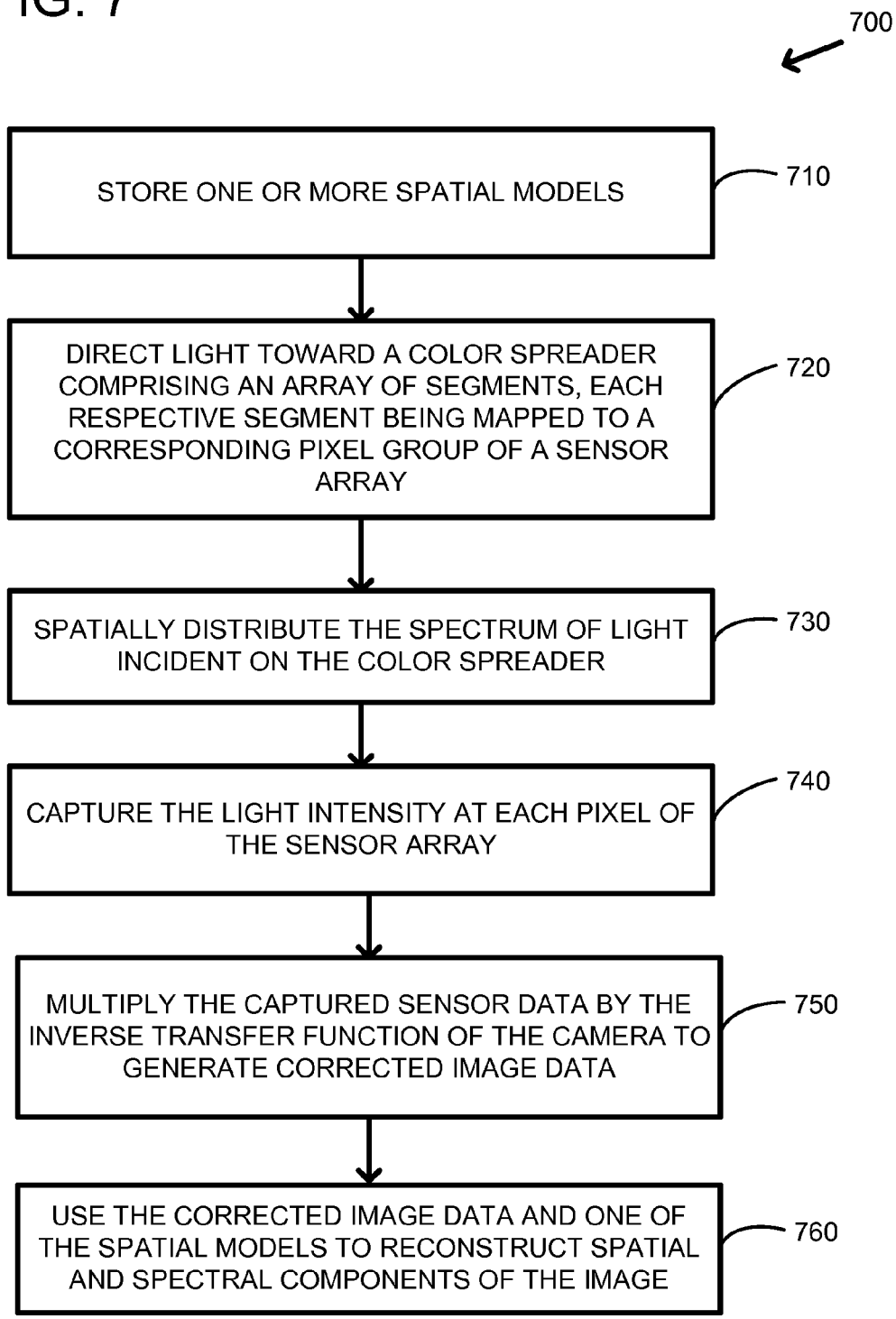
FIG. 7 shows an example method for reconstructing spatial and spectral components of an image.

Once the image is captured by the sensor array 130, software can be used to reconstruct the spectral and spatial components of the image. FIGS. 6-7 illustrate examples of methods for reconstructing the spatial and spectral components of an image.

FIG. 6 shows an example of a method 600 for calibrating a camera, such as the camera 100. The camera 100 can be calibrated so that the effect of the optical system 110 and the color spreader 510 (such as diffraction grating 120) on the image data can be determined. At 610, the camera 100 can be focused on a test scene. For example, the test scene can include one or more point sources of light emitted at one or more wavelengths. A point source target may be useful as the image data may be similar to an impulse response of the optical system 110 and the color spreader 510. As another example, the test scene can include a resolution test pattern, such as the United States Air Force resolution test pattern conforming to the MIL-STD-150A standard, the International Organization for Standardization (ISO) 12233:2014 test pattern, or the Society of Motion Picture and Television Engineers (SMPTE) test pattern conforming to the SMPTE Engineering Guideline EG 1-1990.

At 620, image data associated with the test scene can be captured. For example, the sensor array 130 can capture the image data and store the image data in a memory, such as captured image data 150.

At 630, a transfer function of the camera 100 can be calculated. The transfer function can mathematically represent the spreading or blurring function of the camera 100. The transfer function of the camera 100 can include a transfer function of the color spreader 510. In one embodiment, the color spreader 510 can be the diffraction grating 120. The transfer function can be computed by comparing the captured image data of the test scene to ideal image data associated with the test scene. At 640, the transfer function can be inverted to create an inverse transfer function of the camera 100.

FIG. 7 illustrates an example method 700 for reconstructing the spatial and spectral components of an image. For example, the spatial and spectral components of the image can be reconstructed using the camera 100. At 710, one or more spatial models can be stored in a computer-readable storage medium, such as the spatial model(s) 170. Different spatial models can correspond to different types or classes of objects. A spatial model can include statistical or other information about the appearance of objects in the class. For example, a spatial model can include probable color combinations, a measure of correlation between pixels, a measure of sparseness of the object, properties of edges, or other information.

At 720, light can be directed toward a color spreader 510. The color spreader 510 is in an optical path of the light as the light travels toward the sensor array 130. In one embodiment, the color spreader 510 can be the diffraction grating 120. The color spreader 510 can include an array of segments, where each segment can be mapped to a corresponding group of pixels (e.g., pixel group) of a sensor array. In one embodiment, the segments can be the diffraction segments 210 and 220, and the pixel group can be the pixel group 440 of the sensor array 130. The array of segments can include multiple types and/or orientations of segments arranged in a regular or random pattern. For example, a first type of segment can be configured to spread light primarily along one axis and a second type of segment can be configured to spread light primarily along a different axis. The axes can have a variety of angular relationships, such as perpendicular, for example. As another example, a first type of segment can be configured to spread light across a narrow area and a second type of segment can be configured to spread light across a wider area. In one embodiment, the color spreader 510 includes two types of segments, and the different segments are arranged in a checkerboard pattern on the array of segments. Each of the segments of the color spreader 510 can be mapped to a corresponding group of pixels of the sensor array 130. For example, the corresponding group of pixels of the sensor array 130 can be the pixel group aligned with the segment in a direction along the optical axis 115. In other words, the segment can be in the optical path of its corresponding pixel group.

At 730, the spectrum of light incident on the color spreader 510 can be spatially distributed. For example, the spectrum of light can be spread by refraction or diffraction and directed toward the sensor array 130. The spectrum of light can be spatially distributed over an area that includes multiple pixels. For example, the spectrum of light can be spatially distributed over pixel group 440. In one embodiment, the spectrum of light can be spatially distributed over multiple pixel groups.

At 740, the light intensity at each pixel of the sensor array can be captured. As one example, the values of all of the pixels of the sensor array can be captured at one time, such as when the sensor array is a CCD array. As another example, the values of the pixels of the sensor array can be captured one row or column at one time, such as when the sensor array is a CMOS sensor array. The image data can comprise a frame of the captured pixel values of the sensor array 130. In other words, the image data can comprise a two-dimensional array of intensity values captured at each pixel. The image data includes a blend of spectral and spatial information. For example, if the color spreader 510 were absent, the image data would be purely spatial and the light hitting each pixel would only indicate where the light came from. However, the color spreader 510 spatially distributes the light, such as across a pixel group, based on the wavelength of the light. Thus, the light hitting a pixel may be due to the point in space where the light came from (the spatial component) or the wavelength of the light (the spectral component).

At 750, the image data (e.g., the captured sensor data) can be multiplied by the transfer function of the camera 100 to generate corrected image data. At 760, the corrected image data and one of the spatial models can be used to reconstruct (e.g., un-mix) the spectral and spatial components of the image. For example, the corrected image data from 750 can be classified into a class of objects based on a statistical analysis of the corrected image data. A spatial model can be selected based on the classification of the image data. The spatial model can then be used as a constraint to recover the spectral and spatial components of the image. For example, compressive sensing techniques can be used to solve for the spectral and spatial components of the image by using constraints or assumptions of the spatial model. The spatial model can indicate the amount of correlation across the image and so neighboring pixel values can be used to reconstruct the spectral and spatial components corresponding to a pixel.

Figure 8:
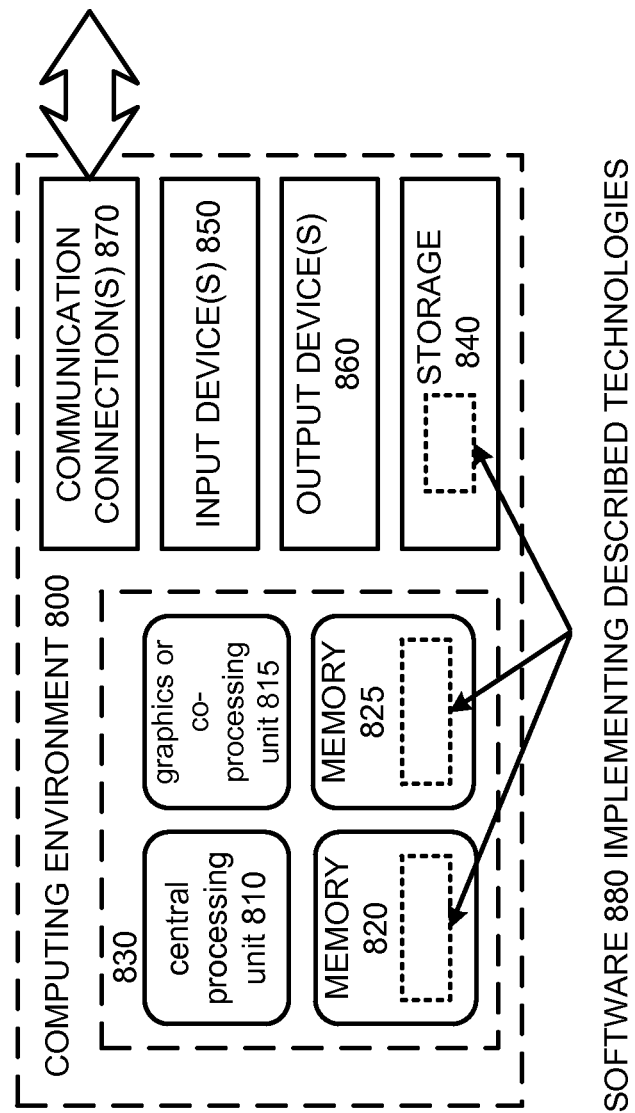
FIG. 8 depicts a generalized example of a suitable computing environment in which the described innovations may be implemented.

FIG. 8 depicts a generalized example of a suitable computing environment 800 in which the described innovations may be implemented. The computing environment 800 is not intended to suggest any limitation as to scope of use or functionality, as the innovations may be implemented in diverse general-purpose or special-purpose computing systems. For example, the computing environment 800 can be any of a variety of computing devices (e.g., desktop computer, laptop computer, server computer, tablet computer, etc.)

With reference to FIG. 8, the computing environment 800 includes one or more processing units 810, 815 and memory 820, 825. In FIG. 8, this basic configuration 830 is included within a dashed line. The processing units 810, 815 execute computer-executable instructions. A processing unit can be a general-purpose central processing unit (CPU), processor in an application-specific integrated circuit (ASIC) or any other type of controller. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), non-volatile memory (e.g., ROM, EEPROM, flash memory, etc.), or some combination of the two, accessible by the processing unit(s). The memory 820, 825 stores software 880 implementing one or more innovations described herein, in the form of computer-executable instructions suitable for execution by the processing unit(s).

A computing system may have additional features. For example, the computing environment 800 includes storage 840, one or more input devices 850, one or more output devices 860, and one or more communication connections 870. An interconnection mechanism (not shown) such as a bus, controller, or network interconnects the components of the computing environment 800. Typically, operating system software (not shown) provides an operating environment for other software executing in the computing environment 800, and coordinates activities of the components of the computing environment 800.

The tangible storage 840 may be removable or non-removable, and includes magnetic disks, magnetic tapes or cassettes, CD-ROMs, DVDs, or any other medium which can be used to store information in a non-transitory way and which can be accessed within the computing environment 800. The storage 840 stores instructions for the software 880 implementing one or more innovations described herein.

The input device(s) 850 may be a touch input device such as a keyboard, mouse, pen, or trackball, a voice input device, a scanning device, or another device that provides input to the computing environment 800. The output device(s) 860 may be a display, printer, speaker, CD-writer, or another device that provides output from the computing environment 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub-combinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

What is claimed is:

1. A camera, comprising:
   an optical system for focusing an image;
   a sensor array comprising a plurality of pixels, the sensor array configured to capture image data;
   a diffraction grating positioned between the optical system and the sensor array, the diffraction grating comprising an array of diffraction segments for diffracting, blending, and spreading a spectrum of incident light toward a corresponding group of pixels in the sensor array, wherein the diffraction grating comprises a first diffraction segment including slits running along a first axis of the diffraction grating and a second diffraction segment including slits running along a second axis of the diffraction grating, the second axis different from the first axis;
   a memory for storing one or more spatial models; and
   a controller coupled to the sensor array and the memory, the controller configured to reconstruct unblended spectral and spatial components of the image from the captured image data and one of the spatial models.

2. The camera of claim 1, wherein each diffraction segment comprises a grating comprising a first angled portion and a second angled portion.

3. The camera of claim 1, wherein each diffraction segment is angled with respect to a light-detecting surface of the sensor array so that a first-order maximum of the diffracted light is directed toward the group of pixels corresponding to the diffraction segment.

4. The camera of claim 1, wherein each diffraction segment comprises a plurality of parallel bars, and a plane through the plurality of parallel bars forms an angle of between twenty and sixty degrees with respect to a light-detecting surface of the sensor array.

5. The camera of claim 1, wherein the spectral and spatial components associated with a first pixel of the sensor array are reconstructed by correlating an intensity value of the first pixel with intensity values of neighboring pixels of the sensor array.

6. The camera of claim 1, wherein the controller is further configured to reconstruct an image by multiplying the captured image data by an inverse transfer function of the diffraction grating.

7. The camera of claim 1, wherein the first diffraction segment and the second diffraction segment are arranged in a checkerboard pattern.

8. A camera, comprising:
   an optical system for focusing an image;
   a sensor array comprising an array of pixels;
   an array of color spreaders positioned between the optical system and the sensor array for spreading light associated with the image data across the array of pixels so that the sensor array can capture blended spatial and spectral data associated with the image, the array of color spreaders comprising a first segment including slits running along a first axis of the array of color spreaders and a second segment including slits running along a second axis of the array of color spreaders, the second axis different from the first axis; and
   a controller coupled to the sensor array for reconstructing an unblended image from the blended spatial and spectral data using an inverse transfer function of the camera and a spatial model of the image.

9. The camera of claim 8, wherein the array of color spreaders and the sensor array are monolithic.

10. The camera of claim 8, wherein a spatial point of the image data is associated with five or more spectral values.

11. The camera of claim 8, wherein the array of color spreaders comprises a diffraction grating that is angled so that a first-order maximum of the diffracted light is directed toward the sensor array.

12. The camera of claim 8, wherein the array of color spreaders comprises a diffraction grating including a plurality of parallel bars, a plane through the plurality of parallel bars forming an angle of between twenty and sixty degrees with respect to the light-detecting surface of the sensor array.

13. The camera of claim 8, wherein the array of color spreaders comprises at least one prism.

14. The camera of claim 8, wherein the spectral and spatial components associated with a first pixel are reconstructed by correlating an intensity value of the first pixel with intensity values of neighboring pixels.

15. The camera of claim 8, wherein the controller is further configured to reconstruct an image by multiplying sensor array data by an inverse transfer function of the array of color spreaders.

16. A method of detecting an image, comprising:
    storing one or more spatial models;
    directing light toward a color spreader comprising a two-dimensional array of segments, the color spreader in an optical path of an array of light sensors, the array of segments comprising a first segment including slits running along a first axis of the color spreader and a second segment including slits running along a second axis of the color spreader, the second axis different from the first axis;
    spatially distributing a spectrum of light incident on each segment of the color spreader toward a corresponding group of pixels of the array of light sensors, the spectrum of light spatially distributed by refraction or diffraction;
    detecting the intensity of light at each light sensor of the array of light sensors;
    capturing image data from the array of light sensors, the captured image data comprising blended spatial and spectral components of the image; and
    reconstructing unblended spectral and spatial components of the image from the captured image data and one of the spatial models.

17. The method of claim 16, wherein the color spreader is a diffraction grating physically attached to the array of light sensors, and the spectrum of light is spatially distributed by diffraction.

18. The method of claim 17, wherein the spectrum of light incident on each segment is spatially distributed so that a first-order maximum of the diffracted light is directed toward the group of pixels corresponding to the segment.

19. The method of claim 17, wherein each segment comprises a plurality of parallel bars, and a plane through the plurality of parallel bars forms an angle of between twenty and sixty degrees with respect to a light-detecting surface of the sensor array.

* * * * *